(12) United States Patent
Cave

(10) Patent No.: US 12,556,761 B2
(45) Date of Patent: *Feb. 17, 2026

(54) MEDIA STREAMS WITH A WIRELESS ISOCHRONOUS DATA LINK

(71) Applicant: The Nielsen Company (US), LLC, New York, NY (US)

(72) Inventor: Mark Cave, Palm Harbor, FL (US)

(73) Assignee: The Nielsen Co. (LLC), New Yourk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/738,003

(22) Filed: Jun. 8, 2024

(65) Prior Publication Data

US 2024/0334010 A1    Oct. 3, 2024

Related U.S. Application Data

(63) Continuation of application No. 17/887,327, filed on Aug. 12, 2022, now Pat. No. 12,047,640.

(51) Int. Cl.
*H04N 21/442* (2011.01)
*H04L 43/0829* (2022.01)
*H04N 21/85* (2011.01)

(52) U.S. Cl.
CPC ... *H04N 21/44204* (2013.01); *H04L 43/0829* (2013.01); *H04N 21/85* (2013.01)

(58) Field of Classification Search
None
See application file for complete search history.

(56) References Cited

U.S. PATENT DOCUMENTS

2021/0392389 A1* 12/2021 Dixon ............... H04N 21/6582

FOREIGN PATENT DOCUMENTS

WO    WO-2019032860 A1 * 2/2019 ........... H04N 21/435

* cited by examiner

*Primary Examiner* — Omar S Parra

(57) ABSTRACT

Methods, apparatus, systems, and articles of manufacture are disclosed to measure audience exposure to media streams with a wireless isochronous data link. In one example, an apparatus includes a datastore, a network interface circuitry, and processor circuitry. The network interface circuitry obtains a first copy of audio data from a first wireless data link, the audio data transmitted from an audio source device, wherein a second copy of the audio data is transmitted, synchronously to the first copy of the audio data, to an audio sink device over a second wireless data link. The processor circuitry to instantiate data parsing circuitry to parse a media stream identifier from the first copy of the audio data and media identification assignment circuitry to assign the media stream identifier to an audio data log for the audio sink device.

18 Claims, 9 Drawing Sheets

MEDIA STREAMS WITH A WIRELESS ISOCHRONOUS DATA LINK

RELATED APPLICATION

This disclosure is a continuation of U.S. patent application Ser. No. 17/887,327, filed on Aug. 12, 2022. Priority to U.S. Non-Provisional patent application Ser. No. 17/887,327 is hereby claimed.

FIELD OF THE DISCLOSURE

This disclosure relates generally to wireless headset data streams and, more particularly, to measuring audience exposure to media stream with a wireless isochronous data link.

BACKGROUND

Traditionally, audience measurement entities have measured audience engagement levels for media based a number of different types of data measurement. That is, an audience measurement entity (AME) may discern a person is watching media (e.g., television programs, radio programs, movies, DVDs, advertisements, streaming media, websites, etc.) presented to them through analyzing a video stream the person is viewing, analyzing an audio stream the person is listening to, or one or more other methods. In this manner, the AME can determine exposure of that person to the media over time.

BRIEF DESCRIPTION OF THE DRAWINGS

In general, the same reference numbers will be used throughout the drawing(s) and accompanying written description to refer to the same or like parts.

Figure 1:
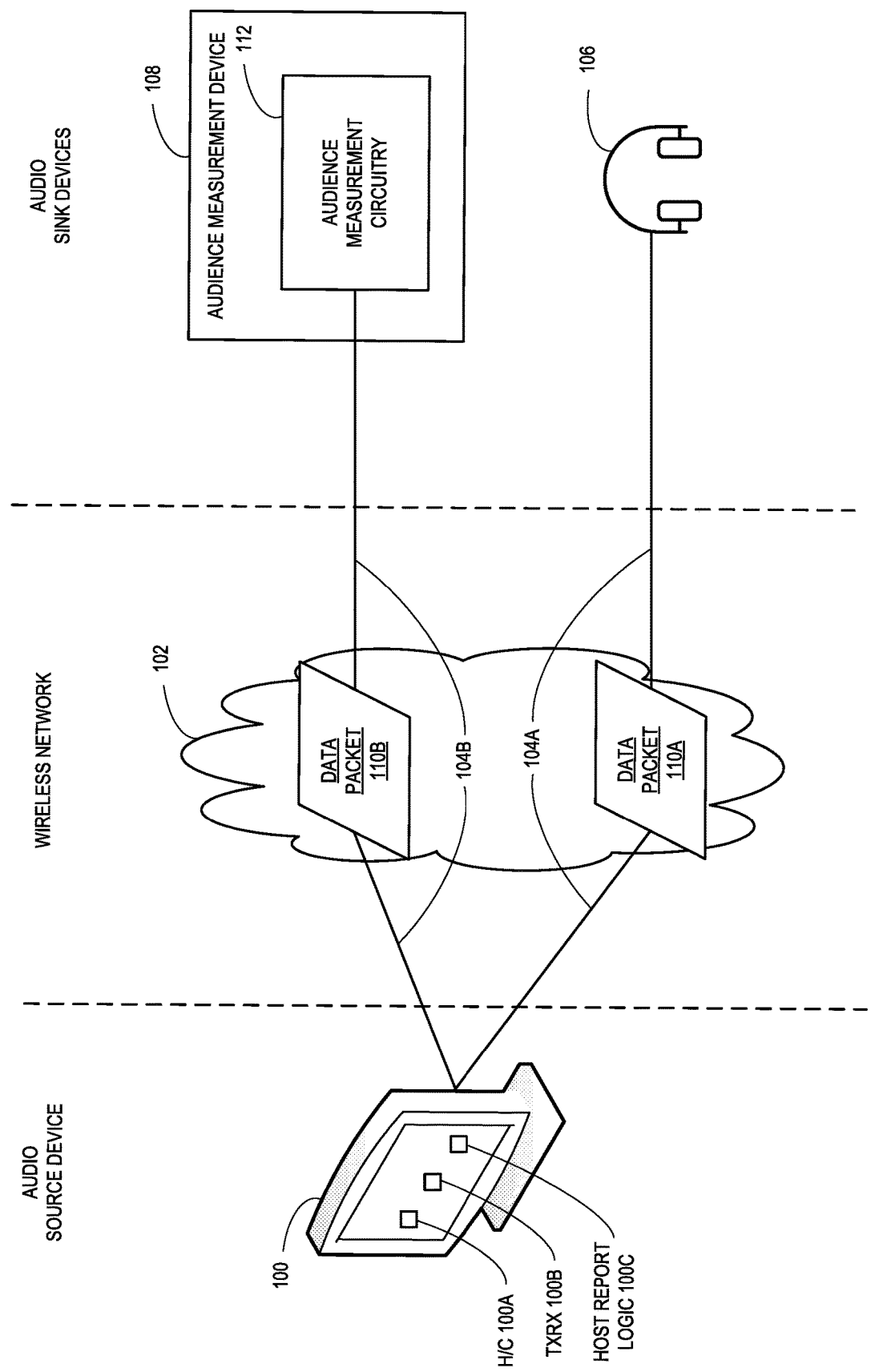
FIG. 1 illustrates an example system to measure audience exposure to media streams with a wireless isochronous data link.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Techniques for measuring audience metrics through media data streams are well known. Generally, an audience member's viewing habits are determined based on monitoring the media stream(s) to which the audience member is exposed. One method of determining the instantaneous viewing habits of an audience member is to analyze the audio data of the media stream to which the person is being exposed. Audio data from a media stream can include media identification information such as watermarks/codes, fingerprints/signatures, and/or other information that may be used to identify presented media. As used herein "media" refers to audio and/or visual (still or moving) content and/or advertisements.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Historically, gathering audio data from a monitored media stream (exposed to consumers) was straightforward insomuch as a television or radio would project audio into a viewing room and an audience measurement device in that room would monitor the audio. For example, an audience measurement device that included a microphone may have been attached to the rear, top, or side of the television or radio and it would listen and record the audio and provide the recorded audio to a central monitoring office for analysis and aggregation with audio data from other monitored media streams. For example, an audience member may watch a media stream on much wider array of media viewing devices, such as a laptop computer, mobile phone, or other mobile device. Such mobile media viewing devices create further complexities for the monitoring process due to their portability. Furthermore, instead of listening to the audio projected through speakers on a TV, computer, or phone, audience members commonly listen to the audio through headphones. In many cases, the headphones are wireless and linked to the media viewing device through a protocol utilized by Bluetooth® technology, among others. Thus, traditional audience measurement devices with microphones listening to audio in a room are not effective because the audio is only heard directly by the audience member through the headphones.

As used herein, an "audience measurement device" includes any device that can receive (e.g., obtain) audio data from a media stream and then perform some type of analysis or other work on the audio data. For example, an audience measurement device may parse the audio data in a media stream for unique watermarks/codes, fingerprints/signatures, and/or other information that may be used to identify presented media.

Some wireless protocols that provide an ability to transmit audio data from an audio source device (e.g., a TV, computer, tablet, phone, etc.) to an audio sink device (e.g., headphones, wireless speakers, etc.) include the ability to transmit the audio data to multiple audio sink devices in a synchronized, concurrent manner. For example, with the 5.2 version of the Bluetooth® Core Specification, released on Dec. 31, 2019, isochronous channels were introduced, which allow the communication of time-bound data (e.g., audio data) to one or more devices for time-synchronized processing. The isochronous channels format can be used over multiple separate connections (e.g., multiple simultaneous point-to-point connections, such as audio source device to audio sink device connections) or it can be broadcast from a single source device (e.g., audio source device) to an unlimited number of sink devices (e.g., audio sink devices) in a connectionless fashion.

Examples disclosed herein measure audience exposure to media streams with a wireless isochronous data link. In some examples, media streams on a wireless network are monitored. The example media streams may include multiple copies of audio data that may be transmitted across the wireless network in an isochronously synchronized manner, via wireless data links. As used herein, a "data link" means a communication channel established between two devices over a network that enables either bi-directional or uni-directional communication by way of transmitting data packets that include audio data. In some examples, a data packet is a packetized amount of data that includes a packet header and a data payload. An example packet header may include header information such as a destination address of the intended recipient of the packet, information as to the type, format, and size of data in the data payload, among other information. An example data payload may include the data to be transferred, such as audio data in a format that can be translated or decoded by the receiving device. Other data payloads may include frames or partial frames of image data for a video stream, sensor data, and/or telemetry data, among other types of data included in the data payload portion of a data packet.

In some examples, an audience member is exposed to (e.g., is listening to) audio data from a media stream that is being transmitted wirelessly from an audio source device to an audio sink device. The example audio source device described herein means any type of device that can wirelessly transmit a media stream with audio data, such as a smart TV, a desktop computer, a laptop computer, a tablet computer, a smartphone, a wearable device, or an embedded device in a larger system (e.g., an automobile), among other devices. The example "audio sink device" means any type of device that can receive (e.g., obtain) the wirelessly transmitted media stream with the audio data. In some examples, the audio sink device may also have the capability to playback the audio data in the received media stream, such as wireless headphones or wireless speakers, among other devices. In some examples, the audio sink device may not playback the audio data, but rather performs other operations on the audio data. For example, an audio sink device may store the audio data in a database, may analyze the audio data, and/or may forward the audio data from the received media stream to one or more additional devices.

In examples disclosed herein, an audio source device isochronously (e.g., synchronously, simultaneously) transmits the media stream to more than one audio sink device. For example, a smart TV (e.g., the source device) can be wirelessly linked to both a pair of wireless headphones (e.g., the first audio sink device) and to an audience measurement device (e.g., the second audio sink device), where each wireless link can capably transmit the media stream (and the audio data) to its respective audio sink device. Thus, with such a system topology, an audience member can listen to a first copy of the audio data at the same time the audience measurement device can record and analyze a second copy of the audio data, where both copies of the audio data are isochronously transmitted to each respective audio sink device. In some examples, the isochronous nature of multiple wireless links allows for synchronization of the audience member exposure to the audio data with the analysis of the audio data even though the analysis is taking place on a separate link with separate copies of the audio data.

In some examples, with a point-to-point connection-based isochronous link between the audio source device and the first audio sink device (e.g., the wireless headphones), the audio source device may become aware of either a loss of one or more data packets sent to the wireless headphones or a complete loss of connection between the source and sink devices.

In examples disclosed herein, the audio source device provides (e.g., transmits, sends) additional information beyond the media stream to the audience measurement device. For example, the audio source device may provide one of several indicators to the audience measurement device, such as: A) when the wireless transmission of the media stream to the first audio sink device begins, B) when the wireless transmission of the media stream to the first audio sink device ends, and/or C) when the wireless transmission of the media stream to the first audio sink device loses data packets (e.g., meaning the wireless signal between the audio source device and the first audio sink device may have degraded). In examples disclosed herein, the audience measurement device may pause or discontinue parsing and/or other analysis of the media stream in response to one or more additional indicators of information received from the audio source device. In some examples, the audience measurement device is communicatively coupled (e.g., through another wireless link) to the first audio sink device (e.g., the wireless headphones) and receive indicators directly from the first audio sink device to determine whether to begin, end, or pause parsing and/or other analysis of the media stream.

FIG. 1 illustrates an example system that measures audience exposure to a media stream with a wireless isochronous data link. The illustrated example of FIG. 1 includes an example audio source device 100, a wireless network 102, two data links 104A and 104B, and two audio sink devices including wireless headphones 106 and an audience measurement device 108.

The example audio source device 100 may be any type of device that can wirelessly transmit a media stream with audio data, such as a smart TV, a desktop computer, a laptop computer, a tablet computer, a smartphone, a wearable device, or an embedded device in a larger system (e.g., an automobile), among other devices. As described herein, a smart TV will be used as the audio source device in the examples, although any other form of audio source device could be employed within the same examples.

According to the illustrated example, the audio source device 100 has the capability to wirelessly connect/couple to the wireless network 102. As described herein, the examples and process flows focus on the wireless network being compatible with the 5.2 revision of the Bluetooth® core specification, but a later revision of the Bluetooth® core specification or the specification of another standard that includes isochronous channels capabilities may be implemented instead. Thus, in some examples, the audio source device 100 includes a host controller (H/C) 100A to initialize the wireless network 102, translate data packets to and from the wireless network 102, and manage links to other devices also present on the wireless network 102. Additionally, in some examples, the audio source device 100 also includes a transceiver (TXRX) 100B to transmit data packets across the wireless network 102 as well as receive data packets from the wireless network 102. In some examples, the audio source device 100 further includes a host report logic 100C. The example host report logic 100C enables the communication of additional data to occur over one or more of the data links 104A and/or 104B (e.g., other than traditional audio data). For example, the audio source device 100, via the host report logic 100C, can report information about the health of a first data link (e.g., data link 104A) to an alternate audio sink device (e.g., an audience measurement device 108) over a second data link (e.g., data link 104B) via a health status report in a data packet. Additionally, in some examples, host report logic 100C may send a ready-to-stream indicator, via a data packet over the wireless network 102 to one or more audio sink devices. For example, the ready-to-stream indicator may indicate to one or more audio sink devices (e.g., 106 and 108), communicatively coupled to the audio source device 100 over the wireless network 102, that the audio source device 100 is ready to send a media stream of data packets over each isochronous channel (e.g., each data link 104A and 104B). In some examples, the audience measurement device 108 then sends a ready-to-monitor indicator, via a data packet, to the audio source device 100. For example, the ready-to-monitor indicator tells the audio source device 100 that it can begin streaming a data stream of data packets to the audio sink devices 106 and 108.

In the illustrated example in FIG. 1, the wireless network 102 is a communications network implementing a protocol to that allows both two-way point-to-point communications between devices as well as one-way broadcast communications from a source device to one or more sink devices. In some examples, the wireless network 102 may be a Bluetooth® network or any other type of wireless network that includes capabilities to synchronize sending multiple copies of a media stream to more than one sink device. As described herein, the examples and process flows largely focus on Bluetooth® connection-oriented isochronous channels that use the LE-CIS (Low Energy-Connected Isochronous Stream) logical transport. Connection-oriented isochronous channels enable point-to-point, bi-directional, isochronous communication between two Bluetooth® compatible devices (per isochronous channel). In some examples, the two Bluetooth® compatible devices include an audio source device 100 and an audio sink device (e.g., 106 or 108). In some examples, multiple synchronized isochronous channels may be implemented. For example, a first isochronous channel may exist between the audio source device 100 and the wireless headphones 106 and a second isochronous channel may exist at the same time between the audio source device 100 and the audience measurement device 108. According to the illustrated example, a point-to-point CIS data link (e.g., 104A or 104B) is established by the audio source device 100 and each respective audio sink device (e.g., wireless headphones 106 and audience measurement device 108) on wireless network 102. The wireless headphones 106 may be interchangeably referred to as the first audio sink device 106 and the audience measurement device 108 may be interchangeably referred to as the second audio sink device 108. In alternative examples, Bluetooth® connection-less isochronous communication can be implemented to perform using BIS (Broadcast Isochronous Streams), which support uni-directional communication only.

In some examples, the process of establishing the data links 104A and 104B is a standard data link creation process as per the Bluetooth® protocol. For example, when the wireless network 102 is a Bluetooth® network, the H/C 100A in the audio source device 100 may initiate an LE Create CIS command that creates a CIS between the audio source device 100 and an audio sink device. In such an example, the CIS may be specified in the command as well as accessible on the wireless network 102. In some examples, audio sink devices (e.g., audio sink devices 106 and 108) advertise their availability on the wireless network 102 to the audio source device 100. In some examples, the H/C 100A in the audio source device 100 maintains an array of available audio sink devices with which to confirm audio sink device availability when attempting to establish a data link. In some examples, the audio source device 100 and/or one or more of the audio sink devices 106 and 108 may initiate any other data link creation process that is capable of creating/establishing data links between such devices on the wireless network 102.

The example audio source device 100 may provide access to a media stream to individual audio sink devices 106 and/or 108 upon request. Thus, in some examples, one or more of the audio sink devices 106 and/or 108 may request a media stream that includes the audio data. In the illustrated example, once the data links 104A and 104B have been established, the audio source device may transmit (e.g., send, transfer) data packets isochronously across the wireless network 102 to the audio sink devices 106 and 108, such as data packet 110A, via data link 104A, to the first audio sink device 106 (e.g., the wireless headphones) and data packet 110B, via data link 104B, to the second audio sink device 108 (e.g., the audience measurement device). In some examples, data packets 110A and 110B are two copies of the same data packet. In some examples, data packets 110A and 110B have the same data payload, but different headers and/or addressing information. From the isochronous channels point of view, each data packet is unique, but the data payloads within both packets are the same. Data packets 110A and 110B illustrate a sample data packet for illustrative purposes, but in some examples, data packets 110A and 110B are just one of a series (e.g., stream) of consecutive data packets the audio source device 100 transmits to the audio sink devices, 106 and 108, respectively.

In some examples, synchronously to each "A" data packet (e.g. data packet 110A) being received by the first audio sink device 106 (e.g., the wireless headphones), the audience measurement device 108 receives each "B" data packet (e.g., data packet 110B). As used herein, "synchronously," "simultaneously," and "isochronously" are interchangeable and, when referencing the comparable arrival times of data packets at multiple audio sink devices, they do not refer to a literal same time, but rather within an isochronous window of receiving a packet. In some examples, to be considered synchronized data packet arrivals across all sink devices receiving a copy of the data packet, an isochronous arrival window of time may defined within the specification of a given wireless network 102 that has isochronous channel compatibility.

According to the illustrated example, the audio source device 100 simultaneously transmits a first stream of audio data across wireless data link 104A to the wireless headphones 106 and a second stream of the same audio data across wireless data link 104B to the audience measurement device 108. During the simultaneous transmissions, example audience measurement circuitry 112, within the example audience measurement device 108, receives and processes the "B" data packet stream. The processing may include saving the audio data in the "B" data packet stream into a local datastore, parsing identification information from the audio data as it is received, counting occurrences of audio data identification information as it is parsed from the audio data received, or forwarding the audio data to one or more additional devices, among other processing options. The example audience measurement circuitry 112 is further described below in conjunction with FIG. 2.

In the illustrated example in FIG. 1, the audience measurement device 108 will continue to process the audio data in the "B" data packet stream during the time the wireless headphones 106 are receiving the audio data in the "A" data packet stream. In some examples, when the wireless headphones 106 discontinue receiving all or parts of the audio data in the "A" data packet stream, the audience measurement device 108 will stop or pause processing the audio data in the "B" data packet stream. In some examples, in order for the audience measurement device 108 to be aware of when to stop or pause processing the data in the "B" data packet stream, the audience measurement device 108 may receive an indication/indicator from either the audio source device 100 or the wireless headphones 106. In some examples, the indication/indicator may signal a discontinuation/stop/end of the transmission of the audio data in the "A" data packet stream. In some examples, the indication/indicator may signal a packet loss of one or more "A" data packets that were transmitted by the audio source device 100 to the wireless headphones 106.

In some examples, the audience measurement device 108 receives and processes a continuous "B" stream of data packets while the data link 104A disconnects or has signal loss throughout portions of the entire length of the stream. In such situations, the example audience measurement device 108 may request a connection log of the 104A data link to determine what audio data was successful in reaching the wireless headphones 106. In some examples, the example audience measurement device 108 may post-process the audio data received throughout the length of the stream by only counting identification information of the audio data received by the wireless headphones 106.

In some examples, the audience measurement device 108 may lose "B" data packets in the process of receiving its own stream of audio data from the audio source device 100 or lose the 104B data link altogether. In such situations, the example audience measurement device 108 may send a request to the audio source device 100 to resend, at a later time, the audio data that the wireless headphones had received when the "B" stream was not viable to process.

Figure 2:
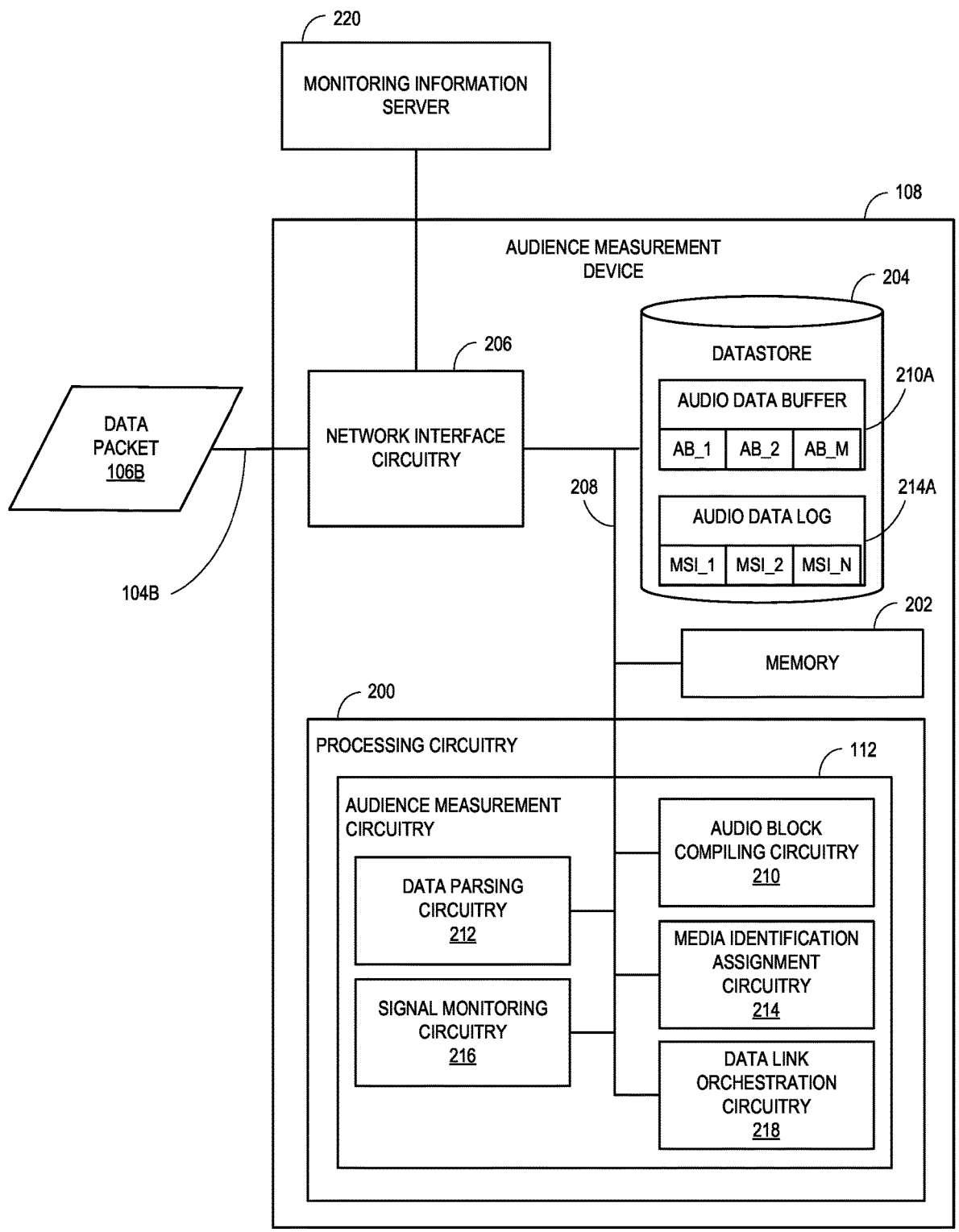
FIG. 2 is a block diagram of example audience measurement circuitry to measure audience exposure to media streams with a wireless isochronous data link.

FIG. 2 is a block diagram of an example audience measurement circuitry 112 to measure audience exposure to media streams with a wireless isochronous data link. In the illustrated example of FIG. 2, an audience measurement device 108 includes processing circuitry 200, memory 202, datastore 204, and network interface circuitry 206. The example audience measurement device 108 may be a laptop computer, a desktop computer, a workstation, a phone, a tablet, an embedded computer, or any other type of computing device. In some examples, the audience measurement device 108 may be a virtual machine running on a single physical computing device or a virtual machine running on portions of several computing devices across a distributed network or cloud infrastructure. In some examples, an interface 208 communicatively couples the processing circuitry 200, the memory 202, the datastore 204, and the network interface circuitry 206. The interface 208 may me any type of one or more interconnects that enable data movement between the processing circuitry 200, the memory 202, the datastore 204, and the network interface circuitry 206 within the audience measurement device 108.

The example processing circuitry 200 (which includes the audience measurement circuitry 112) may include portions or all of a general purpose central processing unit (CPU), a graphical processing unit (GPU), an application specific integrated circuit (ASIC), a field programmable gate array (FPGA), or any other type of processing logic capable of performing audience measurement circuitry 112 operations described below. The example memory 202 may store instructions to be executed by the processing circuitry 200 and/or one or more other circuitries within the audience measurement device 108. In different examples, the memory 202 can be physical memory that could include volatile memory (e.g., dynamic random access memory (DRAM), static random access memory (SRAM), etc.) non-volatile memory, buffer memory within a processor, a cache memory, or any one or more other types of memory.

According to the illustrated example, the datastore 204 may be a single datastore included in the audience measurement device 108 or it may be a distributed datastore, which may be implemented by any number and/or type(s) of datastores. The datastore 202 may be implemented by volatile memory, non-volatile memory, or one or more mass storage devices such as hard disk drive(s) (HDD(s)), compact disk (CD) drive(s), digital versatile disk (DVD) drive(s), solid-state disk (SSD) drive(s), etc., or any other type of capable data storage technology. Furthermore, the data stored in the datastore 204 may be in any data format such as, for example, binary data, comma delimited data, tab delimited data, structured query language (SQL) structures, etc.

In the illustrated example, the network interface circuitry 206 may include one or more host controllers, one or more transceivers (e.g., transmission TX and receiving RX units), and/or one or more other circuitries capable of communicating across a network. The example network interface circuitry 206 includes one or more Bluetooth®-compatible host controllers and/or Bluetooth®-compatible transceivers to enable the audience measurement device 108 to communicate (e.g., send/receive data packets) over a wireless network, such as wireless network 102 (FIG. 1) (e.g., a Bluetooth® network as above) and/or one or more additional wireless networks (e.g., an IEEE 802.11-based wireless network, among others). For example, the network interface circuitry 206 may receive a data packet over a wireless network signal (e.g., data packet 106B over wireless data link 104B) and provide the data from the data payload portion of the data packet to one or more circuitries within the audience measurement device 108, such as to audience measurement circuitry 112. In some examples, the network interface circuitry 206 includes one or more wired network host controllers and/or transceivers to enable the audience measurement device 108 to communicate over a wired network, such as an Ethernet network or one or more other wired networks.

In some examples, the apparatus includes means for obtaining audio data from a wireless data link. For example, the means for obtaining may be implemented by network interface circuitry 206. In some examples, the network interface circuitry 206 may be instantiated by processor circuitry such as the example processor circuitry 612 of FIG. 6. For instance, the network interface circuitry 206 may be instantiated by the example microprocessor 700 of FIG. 7 executing machine executable instructions such as those implemented by at least block 302 of FIG. 3. In some examples, the network interface circuitry 206 may be instantiated by hardware logic circuitry, which may be implemented by an ASIC, XPU, or the FPGA circuitry 800 of FIG. 8 structured to perform operations corresponding to the machine readable instructions. Additionally or alternatively, the network interface circuitry 206 may be instantiated by any other combination of hardware, software, and/or firmware. For example, the network interface circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example audience measurement circuitry 112 may be instantiated (e.g., creating an instance of, bring into being for any length of time, materialize, implement, etc.) by processor circuitry such as a central processing unit executing instructions. Additionally or alternatively, the example audience measurement circuitry 112 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example of FIG. 2, the audience measurement circuitry 112 includes audio block compiling circuitry 210 to compile audio blocks of audio data from data packets obtained by the network interface circuitry 206, via the wireless data link 104B. In some examples, the network interface circuitry 206 obtains a stream (e.g., plurality) of data packets (e.g., data packet 106B). Each example data packet in the stream includes a packet header and a data payload. In some examples, the data in the data payload, per data packet, is an amount of audio data. According to the illustrated example, the audio block compiling circuitry 210 obtains (e.g., receives) the audio data, per data packet, from the network interface circuitry 206 and compiles audio blocks from the audio data. As used herein, an "audio block" means a timed amount of the audio data from the data packet stream. For example, the audio block compiling circuitry 210 may compile audio blocks of audio data one second in length.

Depending on the size of the data payload in each data packet, such as data packet 106B, the audio block compiling circuitry 210 may take audio data from multiple data packet payloads to create a single audio block of audio data or may separate a single data payload into multiple audio blocks of audio data. In some examples, the audio block length may be greater than or less than one second. In some examples, the audio block compiling circuitry 210 includes a time and date stamp on the beginning of each compiled audio block to provide a chronological index into a group of audio blocks that were compiled from a stream of audio data.

According to the illustrated example, the audio block compiling circuitry 210 maintains an audio data buffer 210A in the datastore 204 with a series of consecutive (e.g., chronological) audio blocks (e.g., AB_1 (audio block 1), AB_2, and up through AB_M). The example audio block compiling circuitry 210 updates the audio data buffer 210A with a new audio block once the audio block has been compiled. In some examples, the audio data buffer 210A includes all audio blocks that have been compiled by the audio block compiling circuitry 210 in the audio data buffer 210A from the beginning of the stream to the end. In some examples, the audio data buffer 210A includes a rolling window of the most recent X number of seconds of obtained audio data from the wireless data link 104B (e.g., the audio data buffer 210A may include the most recent 60 seconds (X=60) of audio data obtained from the wireless data link 104B).

Figure 3:
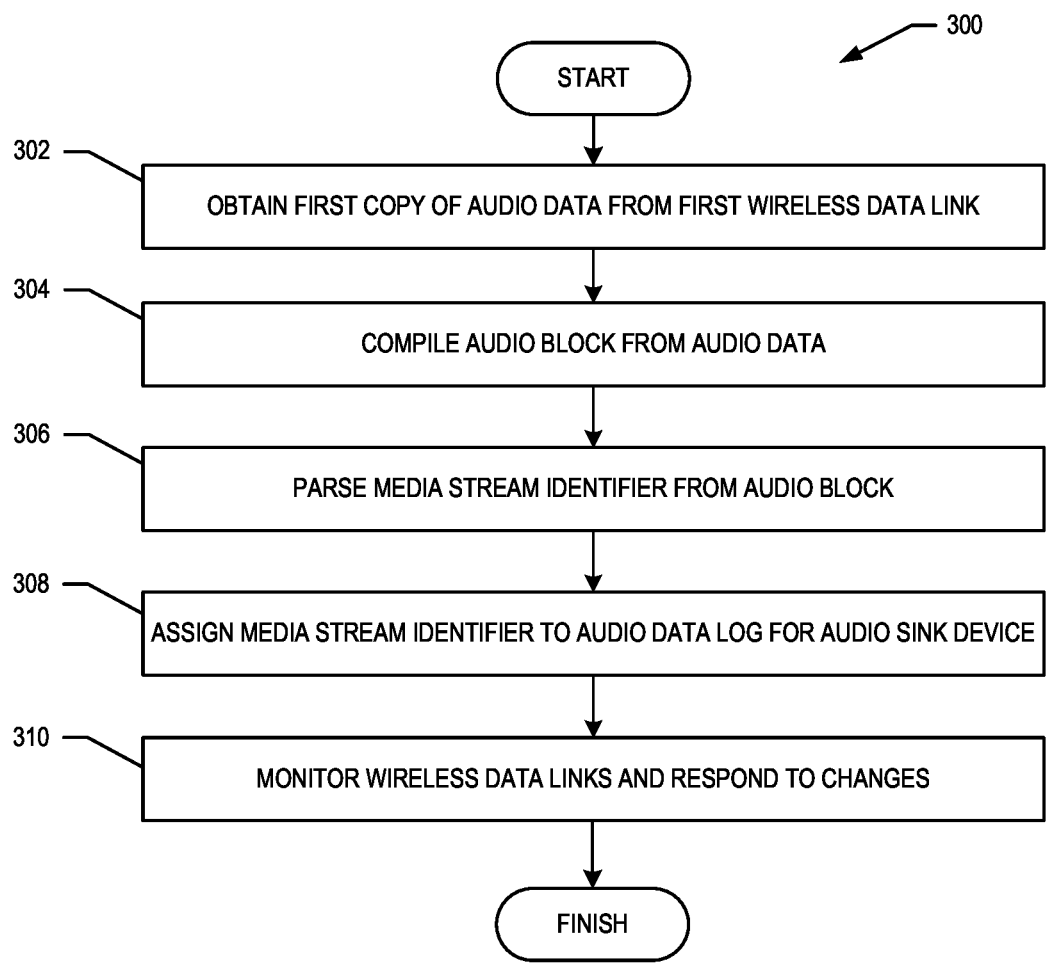
FIG. 3 is a flowchart representative of example machine readable instructions and/or example operations that may be executed by example processor circuitry to implement the audience measurement circuitry of FIG. 1 or 2 to obtain data from an isochronous wireless data stream.

In some examples, the audio block compiling circuitry 210 is instantiated by processor circuitry executing audio block compiling instructions and/or configured to perform operations such as those represented by the flowchart of FIG. 3.

In some examples, the apparatus includes means for compiling an audio block of audio data. For example, the means for compiling may be implemented by audio block compiling circuitry 210. In some examples, the audio block compiling circuitry 210 may be instantiated by processor circuitry such as the example processor circuitry 612 of FIG. 6. For instance, the audio block compiling circuitry 210 may be instantiated by the example microprocessor 700 of FIG. 7 executing machine executable instructions such as those implemented by at least blocks 306 of FIG. 3. In some examples, the audio block compiling circuitry 210 may be instantiated by hardware logic circuitry, which may be implemented by an ASIC, XPU, or the FPGA circuitry 800 of FIG. 8 structured to perform operations corresponding to the machine readable instructions. Additionally or alternatively, the audio block compiling circuitry 210 may be instantiated by any other combination of hardware, software, and/or firmware. For example, the audio block compiling circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for compiling an audio block includes means for updating an audio data buffer with the compiled audio block.

In the illustrated example in FIG. 2, the audience measurement circuitry 112 includes a data parsing circuitry 212. The example data parsing circuitry 212 accesses audio blocks of audio data in the audio data buffer 210A and parses media stream identifiers (e.g., media stream identification information) from the audio data. In some examples, the media stream identifier parsed from the audio data can include watermarks/codes, fingerprints/signatures, and/or other information that may be used to identify presented media. The example data parsing circuitry 212 may analyze each audio block of audio data and determine a parsed media stream identifier that identifies the media stream at the beginning of the block. In some examples, each audio block in the audio data buffer 210A corresponds to a single media stream identifier. In some examples, the length of time of each audio block is allows more than one media stream identifier to be associated with a single audio block. For example, if an audience member viewing the media stream changes a channel/source of the media stream at a time that does not line up with the beginning of an audio block, then there may be a first media stream identifier corresponding to the beginning of the audio block and a second media stream identifier corresponding to the time within the audio block of the channel/source change.

In some examples, the data parsing circuitry 212 includes a time/date stamp as part of the media stream identifier to enable temporally associating the media stream identifier with the obtained audio data (e.g., media stream identifier 1 (MSI_1) may be stamped at time 0 (e.g., the beginning of the media stream) to indicate the media stream began streaming with the media identified as MSI_1). The example data parsing circuitry 212 may provide each media stream identifier to a media identification assignment circuitry 214 for further processing.

Figure 4:
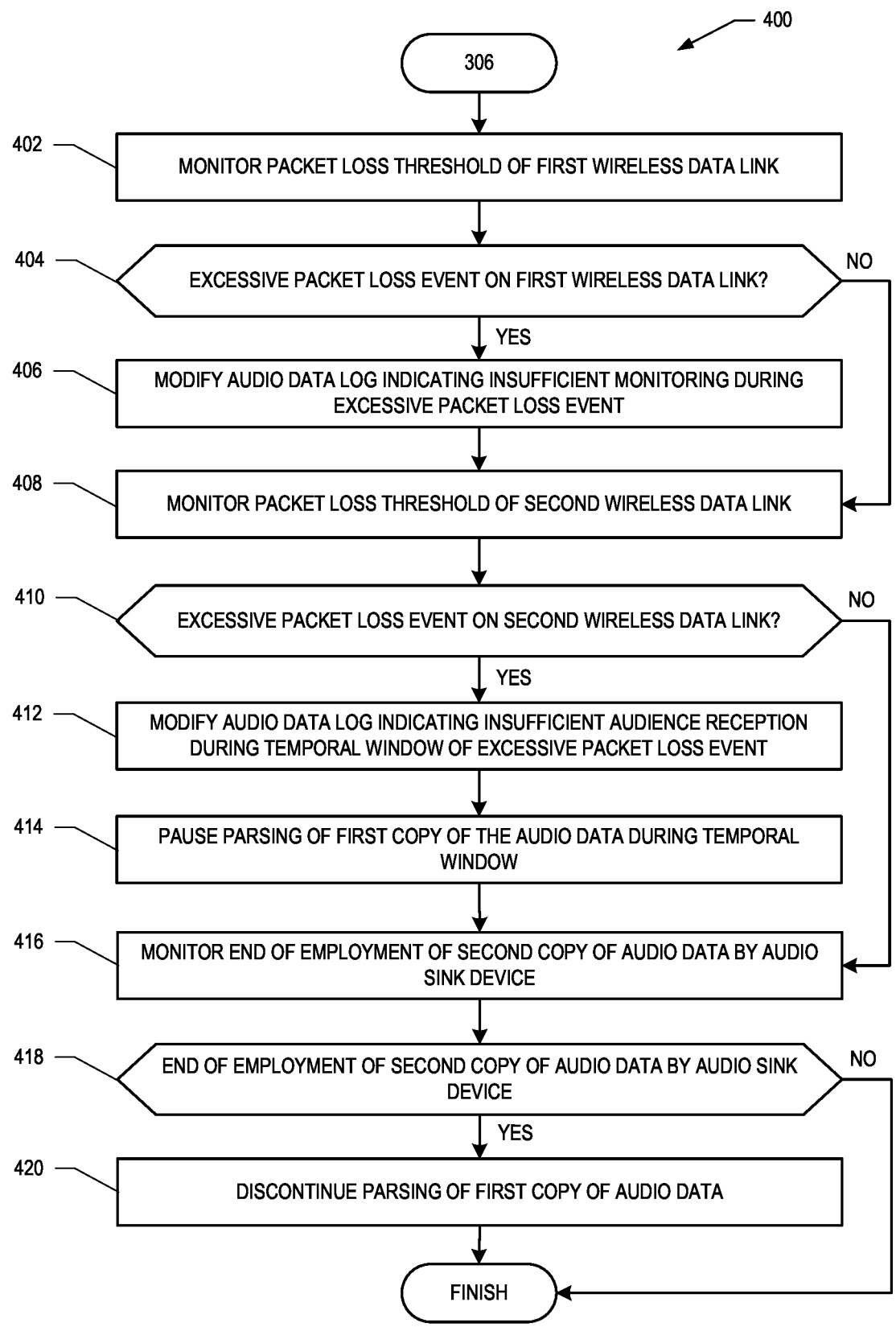
FIG. 4 is a flowchart representative of example machine readable instructions and/or example operations that may be executed by example processor circuitry to implement the audience measurement circuitry of FIG. 1 or 2 to monitor and resolve data packet loss during audience measurement using a wireless data link.

In some examples, the data parsing circuitry 212 is instantiated by processor circuitry (e.g., processing circuitry 200) executing data parsing instructions and/or configured to perform operations such as those represented by the flowcharts of FIGS. 3 and 4.

In some examples, the apparatus includes means for parsing media stream identification information from audio data received from a wireless data signal. For example, the means for parsing may be implemented by data parsing circuitry 212. In some examples, the data parsing circuitry 212 may be instantiated by processor circuitry such as the example processor circuitry 612 of FIG. 6. For instance, the data parsing circuitry 212 may be instantiated by the example microprocessor 700 of FIG. 7 executing machine executable instructions such as those implemented by at least block 306 of FIG. 3 and blocks 414 and 420 of FIG. 4. In some examples, the data parsing circuitry 212 may be instantiated by hardware logic circuitry, which may be implemented by an ASIC, XPU, or the FPGA circuitry 800 of FIG. 8 structured to perform operations corresponding to the machine readable instructions. Additionally or alternatively, the data parsing circuitry 212 may be instantiated by any other combination of hardware, software, and/or firmware. For example, the data parsing circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for parsing includes means for pausing the parsing of the audio data. In some examples, pausing the parsing includes maintaining or saving a current state of the processor circuitry to resume the parsing once the wireless network signal again satisfies the minimum strength required to perform parsing operations. In some examples, the means for parsing includes means discontinuing the parsing of the audio data.

In the illustrated example of FIG. 2, the audience measurement circuitry 110 includes media identification assignment circuitry 214. According to the illustrated example, the media identification assignment circuitry 214 may assign a parsed media stream identifier (e.g., parsed by the data parsing circuitry 212) to an audio data log 214A stored in the datastore 204. The example audio data log includes a list of media stream identifiers (e.g., MSI (media stream identifier 1), MSI_2, and up through MSI_N) to track media stream identifiers over time that correspond to the audio data obtained from the wireless data link 104B. In some examples, the media identification assignment circuitry 214 initiates, maintains, and updates the audio data log. For example, the media identification assignment circuitry 214 may obtain (e.g., receive) a new media stream identifier, such as MSI_1, from the data parsing circuitry 212 that corresponds to the identification of the current media stream (e.g., determined based on the obtained audio data from the wireless data link 104B). The example media identification assignment circuitry 214 then assigns the media stream identifier to the audio data log 214A using a timestamp associated with the audio block the data parsing circuitry 212 pulls from the audio block being parsed that is associated with the media stream identifier.

In the illustrated example of FIG. 2, the media identification assignment circuitry 214 then updates (e.g., adds) the MSI_1 media stream identifier to the audio data log 214A, which saves information in the audio data log 214A that includes the ID of the media stream and also a time/date that corresponds to when the media stream was identified. In some examples, the audio data log 214A keeps a running log of the current media stream identifier for each audio block or for each period of time tracked. So, for example, if the audio data log tracks the media stream identifiers corresponding to the audio data on a per second basis, then the audio data log includes 60 media stream identifiers per minute. In some examples, the audio data log 214A includes only a record of each change of media stream identifiers. For example, the media stream may begin at time 0 with MSI_1 as the identifier and the media identification assignment circuitry 214 obtains the same media stream identifier from the data parsing circuitry 212 over the next 5 minutes, indicating the audience member is consuming (e.g., watching/listening) to the same media stream channel/source. In such an example, at 5 minutes into the media stream consumption, the media identification assignment circuitry 214 obtains a first new media stream identifier (e.g., MSI_2) and only then does the media identification assignment circuitry 214 update the audio data log 214A with the MSI_2 identifier, timestamped at time 300 seconds. The two entries with the change recording version of the audio data log indicates that a first media stream channel (identified by MSI_1) was being consumed for the first 300 seconds and then a second media stream channel (identified by MSI_2) began being consumed.

According to the illustrated example, although the media identification assignment circuitry 214 updates/populates the audio data log 214A based on media stream identifiers parsed from the wireless data link 104B, the nature of the synchronous (e.g., isochronous) wireless data links enables substitution by using media stream identifiers parsed from one wireless data link to be used in the audio data log of the other wireless data link. For example, in FIG. 1, the isochronous synchronization of the 104A wireless data link between the audio source device 100 and the wireless headphones 106 and the 104B wireless data link between the audio source device 100 and the audience measurement device 108 enables media stream identifiers parsed/determined/collected from the 104B wireless data link to substitute for what would be the same media stream identifiers for the 104A wireless data link. Thus, the example media identification assignment circuitry 214 initiates and updates the audio data log 214A and that audio data log 214A may be considered the audio data log for the 104A wireless data link.

In some examples, the media identification assignment circuitry 214 is instantiated by processor circuitry (e.g., processing circuitry 200) executing media identification assignment instructions and/or configured to perform operations such as those represented by the flowchart of FIG. 3.

In some examples, the apparatus includes means for assigning media stream identifiers to an audio data log. For example, the means for assigning may be implemented by media identification assignment circuitry 214. In some examples, the media identification assignment circuitry 214 may be instantiated by processor circuitry such as the example processor circuitry 612 of FIG. 6. For instance, the media identification assignment circuitry 214 may be instantiated by the example microprocessor 700 of FIG. 7 executing machine executable instructions such as those implemented by at least block 308 of FIG. 3. In some examples, media identification assignment circuitry 214 may be instantiated by hardware logic circuitry, which may be implemented by an ASIC, XPU, or the FPGA circuitry 800 of FIG. 8 structured to perform operations corresponding to the machine readable instructions. Additionally or alternatively, the media identification assignment circuitry 214 may be instantiated by any other combination of hardware, software, and/or firmware. For example, the media identification assignment circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the audience measurement circuitry 110 includes signal monitoring circuitry 216. The example signal monitoring circuitry 216 monitors wireless data links, such as wireless data link 104B (FIG. 1) or wireless data link 104A (FIG. 1). Either or both of wireless data links 104A and 104B may experience signal loss (e.g., data packet loss) during the transmission of the media stream. As used herein, "signal loss" means one or more data packets sent from the audio source device 100 (FIG. 1) to an audio sink device (e.g., the audience measurement device 108 and/or the wireless headphones 106 (FIG. 1)) over a wireless data link (e.g., data link 104B) do not arrive at the audio sink device. If a wireless data link (e.g., 104A and/or 104B) experiences signal loss, then monitoring media stream identifiers may become inaccurate because the audience measurement device could be unaware of when a media stream switches channels. Thus, the example signal monitoring circuitry 216 monitors signal losses among other functions and may mitigate any resulting inaccuracies.

According to the illustrated example, the signal monitoring circuitry 216 may experience signal loss of the wireless data link 104B communicatively coupling it to the audio source device 100. If so, and one or more data packets that should have been received are lost (e.g., the network interface circuitry 206 does not obtain one or more data packets sent by the audio source device 100), then the example network interface circuitry 206 may attempt to acquire backup copies of the missing data packets are not received by sending requests to the audio source device 100. In some examples, data packets are really lost and backups are not available. Thus, in such examples, the signal monitoring circuitry 216 may implement a packet loss threshold level. For example, a packet loss threshold level may indicate a maximum acceptable rate of packet loss over a period of time, beyond which may be deemed an excessive packet loss event. Such an excessive packet loss event may take place on one or both of the wireless data link 104B established between the audio source device 100 and the audience measurement device 108 and/or the wireless data link 104A established between the audio source device 100 and the wireless headphones 106.

In response to the excessive packet loss event taking place on the wireless data link 104B, the signal monitoring circuitry 216 may modify the audio data log 214A to indicate insufficient monitoring was available during the time window (e.g., temporal window) of the excessive packet loss event. For example, from time 20 seconds after the start of the media stream to time 30 seconds (e.g., a 10 second window), the signal monitoring circuitry 216 may determine that there are too many lost data packets that should have been received on the wireless data link 104B, thus, the audio data log 214A may indicate as such (e.g., a flag in the log may indicate that monitoring data may be missing from the log during that window of time). Although the wireless data link 104A is the link for measuring the audience, the monitoring occurs through an isochronously synchronized copy of the audio data via wireless data link 104B, which means if wireless data link 104B is experiencing loss of packets, the accuracy of the monitoring data for 104A is degraded.

In response to the excessive packet loss event taking place on the wireless data link 104A, the signal monitoring circuitry 216 may modify the audio data log 214A to indicate insufficient audience reception was available during the time window (e.g., temporal window) of the excessive packet loss event. For example, from time 40 seconds after the start of the media stream to time 60 seconds (e.g., a 20 second window), the signal monitoring circuitry 216 may determine that there are too many lost data packets that should have been received on the wireless data link 104A, thus, the audio data log 214A may measure the audience member incorrectly. In some examples, while the audience measurement device 108 is obtaining/receiving all wireless data packets accurately (e.g., from the audio source device 100 via the wireless data link 104B), the wireless headphones 106 may not be receiving an isochronously synchronized second copy of all data packets containing the audio data. For example, the audience member wearing the wireless headphones 106 may have walked out of the room with the audio source device 100 to answer a knock at the front door, which might have moved the wireless headphones 106 out of range of the audio source device 100. In some examples, until the audience member returns to an acceptable range and resumes consumption of the media stream, data packets in the stream on wireless data link 104A are being lost. The example the signal monitoring circuitry 216 may determine that there are too many lost data packets that should have been received on the wireless data link 104A, thus, the audio data log 214A may indicate as such (e.g., a flag in the log may indicate that while the monitoring data may available (from the 104B wireless data link), the audience member did not actually consume the audio data during that window of time. In some examples, the during an insufficient audience reception event, the signal monitoring circuitry 216 may cause the data parsing circuitry 212 to pause parsing of the copy of the audio data being transmitted via the wireless data link 104B.

According to the illustrated example, the signal monitoring circuitry 216 may monitor an end of employment of the copy of the audio data being transmitted from the audio source device 100 to the wireless headphones 106, via the 104A wireless data link. As used herein, "discontinuing employment" or "ending employment" means one or both of the audio source device 100 and/or the wireless headphones 106 are terminating the wireless data link 104A. When employment of the wireless data link 104A, the signal monitoring circuitry 216 may, in response, cause the data parsing circuitry to discontinue parsing of the audio data obtained via the data link 104B. In some examples, the signal monitoring circuitry 216 may additionally update the audio data log 214A to indicate the data stream of audio data has finished.

The example signal monitoring circuitry 216 may be provided a signal loss (e.g., packet loss) indicator by the network interface circuitry 206 or by the H/C 100A (FIG. 1) in the audio source device 100 (via an informational data packet) when the data packets that are lost were being transmitted across the 104B wireless data link. In some examples, when the signal loss/packet loss occurs on the 104A wireless data link, the signal monitoring circuitry 216 may be provided a signal/packet loss indicator by the H/C 100A in the audio source device 100. For example, the H/C 100A may share a report of a signal loss occurring on a first wireless data link 104A to an audience measurement device 108 on a second wireless data link 104B. In some examples, the wireless headphones 106 may directly report a signal loss problem to the audience measurement device 108 via another wireless data link (using a same or different wireless protocol as wireless network 102) between the wireless headphones 106 and the audience measurement device 108.

In some examples, the signal monitoring circuitry 216 is instantiated by processor circuitry executing signal monitoring instructions and/or configured to perform operations such as those represented by the flowchart of FIG. 4.

In some examples, the apparatus includes means for monitoring a packet loss threshold of a wireless data link. For example, the means for monitoring may be implemented by signal monitoring circuitry 216. In some examples, the signal monitoring circuitry 216 may be instantiated by processor circuitry such as the example processor circuitry 612 of FIG. 6. For instance, the signal monitoring circuitry 216 may be instantiated by the example microprocessor 700 of FIG. 7 executing machine executable instructions such as those implemented by at least blocks 402, 404, 406, 408, 410, 412, 416, and 418 of FIG. 4. In some examples, the signal monitoring circuitry 216 may be instantiated by hardware logic circuitry, which may be implemented by an ASIC, XPU, or the FPGA circuitry 800 of FIG. 8 structured to perform operations corresponding to the machine readable instructions. Additionally or alternatively, the signal monitoring circuitry 216 may be instantiated by any other combination of hardware, software, and/or firmware. For example, the signal monitoring circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for monitoring includes means for determining an end of employment of the audio data by the audio sink device.

In the illustrated example of FIG. 2, the audience measurement circuitry 110 includes data link orchestration circuitry 218. The example data link orchestration circuitry 218, together with the H/C 100A from the source device 100, performs a Bluetooth® pairing process between the audience measurement device 108 and the audio source device 100. The example data link orchestration circuitry 218 seeks permission from the audio source device 100 to obtain a copy of the audio data to be transmitted to the wireless headphones 106. A wireless data link established between the audio source device 100 and another device requires permission from the audio source device 100. In some examples, a point-to-point data connection between the audio source device 100 and the wireless headphones 106 may include audio data that is deemed private, thus, permission from the audio source device 100 may eliminate a privacy breach. In some examples, once the permission has been obtained, the data link orchestration circuitry 218 may orchestrate or help orchestrate a wireless data link between the audio source device 100 and the network interface circuitry 206. In some examples, such orchestration is a standard initialization of a the wireless data link and any resources in both the audio source device 100 and the audience measurement device 108 needed to implement such a wireless data link.

The example data link orchestration circuitry 218 may determine if it has received a ready-to-stream indicator, via a data packet payload or a data packet header (e.g., within an example data packet 110B) received through the network interface circuitry 206. In some examples, the ready-to-stream indicator is a flag or another indicator that provides a status of the audio source device 100. In some examples, the audio source device 100 may indicate, to each audio sink device (e.g., 106 and 108) or at least the audience measurement device 108, that the stream of audio data is about to start.

Alternatively, if the ready-to-stream indicator has been received, then the example data link orchestration circuitry 218 may send a ready-to-monitor indicator, via a data packet payload or a data packet header (e.g., within an example data packet 110B) sent through the network interface circuitry 206 across the wireless network 102 to the audio source device 100.

Figure 5:
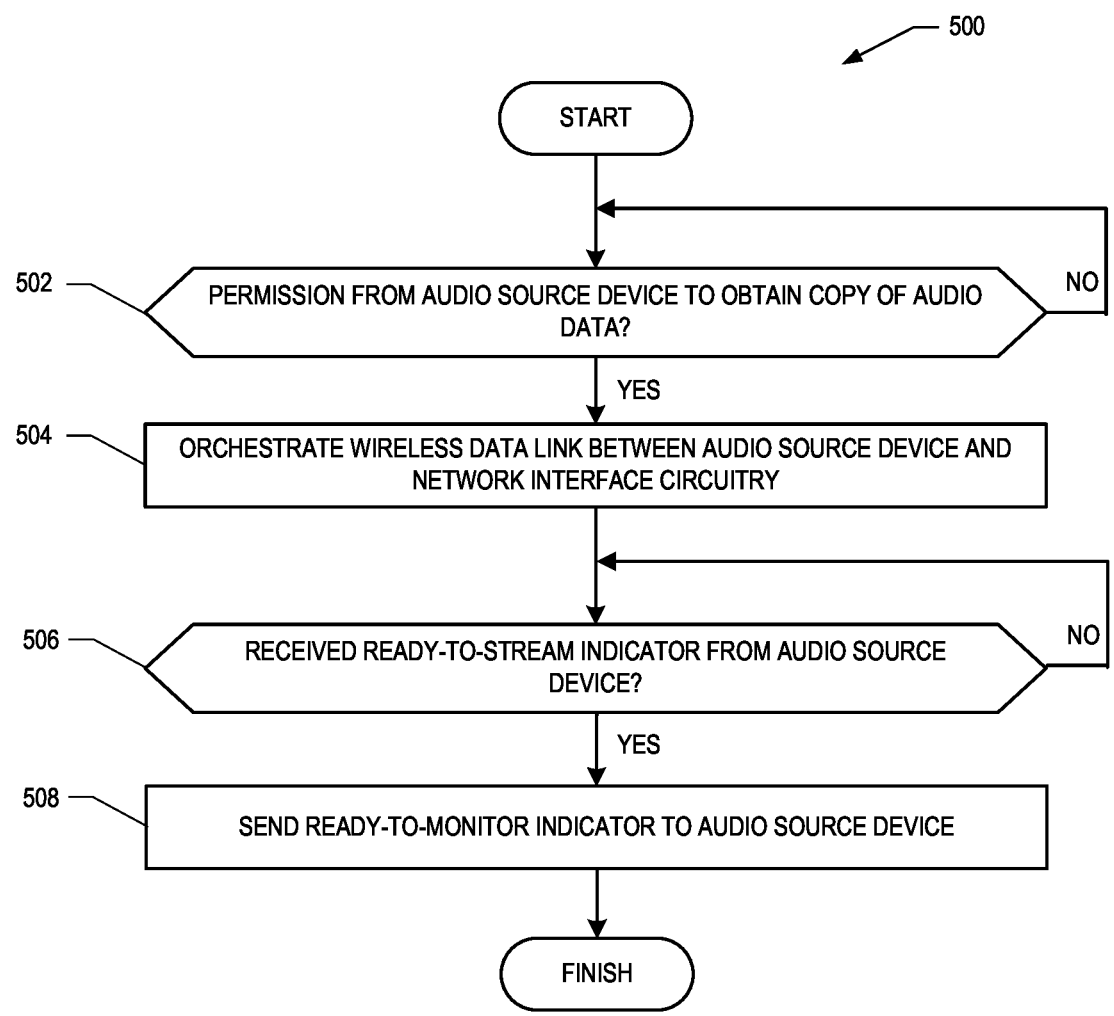
FIG. 5 is a flowchart representative of example machine readable instructions and/or example operations that may be executed by example processor circuitry to implement the audience measurement circuitry of FIG. 1 or 2 to establish a wireless data signal link to a source device.

In some examples, the data link orchestration circuitry 218 is instantiated by processor circuitry executing data parsing instructions and/or configured to perform operations such as those represented by the flowchart of FIG. 5.

In some examples, the apparatus includes means for orchestrating a data link. For example, the means for orches- trating may be implemented by data link orchestration circuitry 218. In some examples, the data link orchestration circuitry 218 may be instantiated by processor circuitry such as the example processor circuitry 612 of FIG. 6. For instance, the data link orchestration circuitry 218 may be instantiated by the example microprocessor 700 of FIG. 7 executing machine executable instructions such as those implemented by at least blocks 502 and 504 of FIG. 5. In some examples, the data link orchestration circuitry 218 may be instantiated by hardware logic circuitry, which may be implemented by an ASIC, XPU, or the FPGA circuitry 800 of FIG. 8 structured to perform operations corresponding to the machine readable instructions. Additionally or alternatively, the data link orchestration circuitry 218 may be instantiated by any other combination of hardware, software, and/or firmware. For example, the data link orchestration circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for orchestrating includes means for determining permission has been provided from an audio source device to obtain the copy of the audio data via the wireless data link (e.g., 104B). In some examples, the means for orchestrating includes means for receiving a ready-to-stream indicator from the audio source device 100. In some examples, the means for orchestrating includes means for sending a ready-to-monitor indicator to the audio source device 100.

According to the illustrated example, a monitoring information server 220 is communicatively coupled to the audience measurement device 108. For example, the network interface circuitry 206 may provide a network interface to couple the audience measurement device 108 to a cloud or other wired or wireless network, to which the monitoring information server 220 is also communicatively coupled. In some examples, the data parsing circuitry 212 obtains a known list of media stream identifiers from the monitoring information server 220 to enable a comparison of the audio data obtained from the wireless data link 104B to such known media stream identifiers. In some examples, the audience measurement circuitry 112 (e.g., the media identification assignment circuitry 214) may send the audio data log 214A to the monitoring information server 220 to upload such audience measurement data to a centralized server for aggregated audience measurement.

In some examples, the audience measurement device 108 receives a connectionless broadcast stream instead of a connection-oriented point-to-point stream. In such examples, the audience measurement device 108 may separately receive information from one or more other audio sink device 106 that such audio sink devices (e.g., wireless headphones 106) are to receive the broadcast stream. For example, the audience measurement device 108 may orchestrate a separate wireless connection (e.g., a second Bluetooth® connection or another wireless protocol connection between itself and the wireless headphones 106). In some examples, such a second Bluetooth® connection may enable the wireless headphones to provide it's receiving status of the broadcast stream from the audio source device 100.

While an example manner of implementing the audience measurement circuitry 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example network interface circuitry 206, the example audio block compiling circuitry 210, the example data parsing circuitry 212, the example media identification assignment circuitry 214, the example signal monitoring circuitry 216, the example data link orchestration circuitry 218, and/or, more generally, the example audience measurement circuitry 112 of FIG. 1, may be implemented by hardware alone or by hardware in combination with software and/or firmware. Thus, for example, any of the example network interface circuitry 206, the example audio block compiling circuitry 210, the example data parsing circuitry 212, the example media identification assignment circuitry 214, the example signal monitoring circuitry 216, the example data link orchestration circuitry 218, and/or, more generally, the example audience measurement circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience measurement circuitry 112 of FIG. 1 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the audience measurement circuitry 112 of FIG. 2 is shown in FIG. 3. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example audience measurement circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc.

For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations that may be executed by example processor circuitry to implement the audience measurement circuitry of FIG. 2 to obtain data from an isochronous wireless data stream. The machine readable instructions and/or operations 300 of FIG. 3 begin at block 302, at which the example network interface circuitry 206 obtains a first copy of audio data from a first wireless data link (104B in FIG. 1). For example, a first data packet (data packet 110B) may include an amount of audio data from the audio source device 100 (FIG. 1). In some examples, the audio data (in streams of data packets) is isochronously synchronized, per data packet (e.g., data packet 110A and data packet 110B) transmitted by the audio source device 100, across the wireless network 102, via wireless data links 104A and 104B, respectively. Thus, the two copies of the same audio data per packet are received in a synchronized manner by the audio sink device 106 (e.g., wireless headphones) and the audio sink device 108, which is an audience measurement device 108. The example network interface circuitry 206 is within the example audience measurement device 108.

At block 304, the example audio block compiling circuitry 210 compiles an audio block from the audio data. For example, the audio block compiling circuitry 210 may take audio data from the data payloads of a stream/plurality of data packets, including data packet 106B, and compile the data into one or more audio blocks.

At block 306, the example data parsing circuitry 212 parses a media stream identifier from the audio block. For example, the data parsing circuitry 212 parses (e.g., analyzes) each compiled audio block and determines one or more media stream identifiers (e.g., comparing against either locally known media stream identifiers or against a list of known media stream identifiers obtained from the monitoring information server 220 (FIG. 2)).

At block 308, the example media identification assignment circuitry 214 assigns the media stream identifier to an audio data log for the audio sink device. For example, the media identification assignment circuitry 214 stores all media stream identifiers in chronological order in the audio data log 214A at a time granularity to be determined (e.g., per second, per 5 seconds, etc.). The example audio data log 214A includes one or more media stream identifiers (e.g., MSI_1, MSI_2, etc.) with timestamps to provide a running look into the streamed media. In some examples, blocks 302, 304, 306, and 308 are performed the audience measurement device 108 continuously, in real-time, as the data packets arrive. In some examples, block 302 is performed continuously, in real-time, but the network interface circuitry 206 stores the data payloads from the arriving data packets into the datastore 204 to allow blocks 304, 306, and 308 to be performed after a delay in time, to allow processing of the stream after the stream has completed (or partially completed).

At block 310, the example signal monitoring circuitry 216 monitors the wireless data links (e.g., 104A and 104B) and responds to changes. In some examples, "changes" refer to one or more of data packet loss observations of the first wireless data link 104B, data packet loss observations of the second wireless data link 104A, or an end of employment of the audio data by the audio sink device 106 (e.g., the wireless headphones 106). An example process that may be executed and/or instantiated by processor circuitry to implement block 310 is described below in connection with FIG. 4.

FIG. 4 is a flowchart representative of example machine readable instructions and/or example operations that may be executed by example processor circuitry to implement the audience measurement circuitry of FIG. 2 to establish a wireless data signal link to a source device. In some examples, the machine readable instructions and/or the operations 400 of FIG. 4 can be executed and/or instantiated by processor circuitry to implement block 310 of the machine readable instructions and/or the operations 300 of FIG. 3.

The machine readable instructions and/or operations 400 of FIG. 4 begin at block 402, at which the example signal monitoring circuitry 216 monitors a packet loss threshold of the first wireless data link (e.g., 104B) between the audio source device 100 and the audience measurement device 108. In some examples, the packet loss threshold is an average value over a period of time. For example, if greater than 3 packets are lost in any rolling 5 second window, the packet loss threshold has been satisfied (e.g. met). Any other rate of packet loss may be utilized to provide a more relevant packet loss rate to use as the packet loss threshold.

At block 404, the example signal monitoring circuitry 216 determines if an excessive packet loss event has taken place on the first wireless data link 104B, based on the monitoring of block 402. In some examples, an excessive packet loss event is a period of time where the packet loss threshold has been satisfied.

If an excessive packet loss event has occurred, then at block 406, the example signal monitoring circuitry 216 modifies the audio data log 214A indicating insufficient monitoring during the excessive packet loss event in response to the excessive packet loss event on the first wireless data link 104B being satisfied. For example, the signal monitoring circuitry 216 may insert information such as a flag and/or other indicators into the audio data log 214A during the period of time of the excessive packet loss event. The example flags/indicators provide contextual information to any entity reading/analyzing such an audio data log 214A that monitoring of the audience measurement during an excessive packet loss event may not be accurate. If an excessive packet loss event has not occurred, the process proceeds from block 404 to block 408.

At block 408, the example signal monitoring circuitry 216 monitors a packet loss threshold of the second wireless data link (e.g., 104A). Similar to block 402, the example signal monitoring circuitry 216 again provides monitoring to a wireless data link, but at block 408 the monitoring involves the wireless data link 104A between the audio source device 100 and the wireless headphones/audio sink device 106. In some examples, monitoring the 104A wireless data link enables the audience measurement device 108 to determine whether the audience member using the wireless headphones 106 was able to consume the audio data.

At block 410, the example signal monitoring circuitry 216 determines if an excessive packet loss event has taken place on the second wireless data link 104A, based on the monitoring of block 408.

If an excessive packet loss event has occurred, then at block 412, the example signal monitoring circuitry 216 modifies the audio data log 214A indicating insufficient audience reception during the excessive packet loss event in response to the excessive packet loss event on the second wireless data link 104A being satisfied. For example, the signal monitoring circuitry 216 may insert information such as a flag and/or other indicators into the audio data log 214A during the period of time of the excessive packet loss event. The example flags/indicators provide contextual information to any entity reading/analyzing such an audio data log 214A that monitoring of the audience measurement during the time (e.g., temporal window) of the excessive packet loss event may not be accurate because the audience member may not have been consuming the audio data during the event. If an excessive packet loss event has not occurred, the process proceeds from block 410 to block 416.

At block 414, the example data parsing circuitry 212 pauses the parsing of the first copy of the audio data during the temporal window of the excessive packet loss event from block 410. For example, in response to the excessive packet loss event occurring, the signal monitoring circuitry 216 may cause the data parsing circuitry 212 to pause the parsing. In some examples, the signal monitoring circuitry 216 may cause the data parsing circuitry 212 to resume the parsing once the excessive packet loss event has concluded (e.g., the packet loss rate has returned to a value less than the packet loss threshold for the 104A wireless data link.

At block 416, the example signal monitoring circuitry 216 monitors an end of employment of the second copy of the audio data by the audio sink device (e.g., the wireless headphones 106). For example, an audience member using the wireless headphones 106 disconnects from the audio source device on purpose because he/she is finished watching the media stream, thus a disconnect takes place and the 104A wireless data link ceases to exist (e.g. end of employment).

At block 418, the example signal monitoring circuitry 216 determines whether an end of employment event for the 104A wireless data link has taken place. For example, the H/C 100A may report such a disconnect to the audience measurement device 108.

If an end of employment of the second copy of the audio data by the audio sink device/wireless headphones 106 takes place, then at block 420, the example data parsing circuitry 212 discontinues parsing of the first copy of the audio data.

FIG. 5 is a flowchart representative of example machine readable instructions and/or example operations that may be executed by example processor circuitry to implement the audience measurement circuitry of FIG. 2 to monitor and resolve data packet loss during audience measurement using a wireless data link. The machine readable instructions and/or operations 500 of FIG. 5 begin at block 502, at which the example data link orchestration circuitry 218 determines if permission from the audio source device 100 to obtain a copy of the audio data being transmitted to an audience member's audio sink device (e.g., the wireless headphones 106) has been granted.

If the permission has been granted, then at block 504, the example data link orchestration circuitry 218 orchestrates a wireless data link between the audio source device and the network interface circuitry 206 in the audience measurement device 108. In some examples, the H/C 100A additionally provides a portion of the orchestration process. For example, both devices in the point-to-point isochronous data link on the wireless network 102 must perform portions of the initialization and start up process to enable the wireless data link 104B between the audio source device 100 and the audience measurement device 108, thus, each of the two devices partially orchestrates the enablement of the wireless data link 104B.

At block 506, the example data link orchestration circuitry 218 determines if it has received a ready-to-stream indicator, via a data packet payload or a data packet header (e.g., within an example data packet 110B) received through the network interface circuitry 206. In some examples, the ready-to-stream indicator is a flag or another indicator that provides a status of the audio source device 100. For example, the audio source device 100 and the audience measurement device 108 may have orchestrated the wireless data link 104B in block 504 and now the audience measurement device 108 waits for an actual stream of audio data from the audio source device 100. In some examples, the audio source device 100 may indicate, to each audio sink device (e.g., 106 and 108) or at least the audience measurement device 108, that the stream of audio data is about to start. In some examples, if the ready-to-stream indicator has not arrived, the audience measurement device 108 continues to wait for the ready-to-stream indicator by returning to block 506.

Alternatively, if the ready-to-stream indicator has been received, then, at block 508, the data link orchestration circuitry 218 sends a ready-to-monitor indicator, via a data packet payload or a data packet header (e.g., within an example data packet 110B) sent through the network interface circuitry 206 across the wireless network 102 to the audio source device 100. For example, when the audience measurement device 108 is ready to start monitoring a data packet stream, to be received via the wireless network 102, the audience measurement device 108 sends the ready-to-monitor indicator.

In some examples, the audience measurement device 108 does not require receipt of a ready-to-stream indicator to send the ready-to-monitor indicator.

Figure 6:
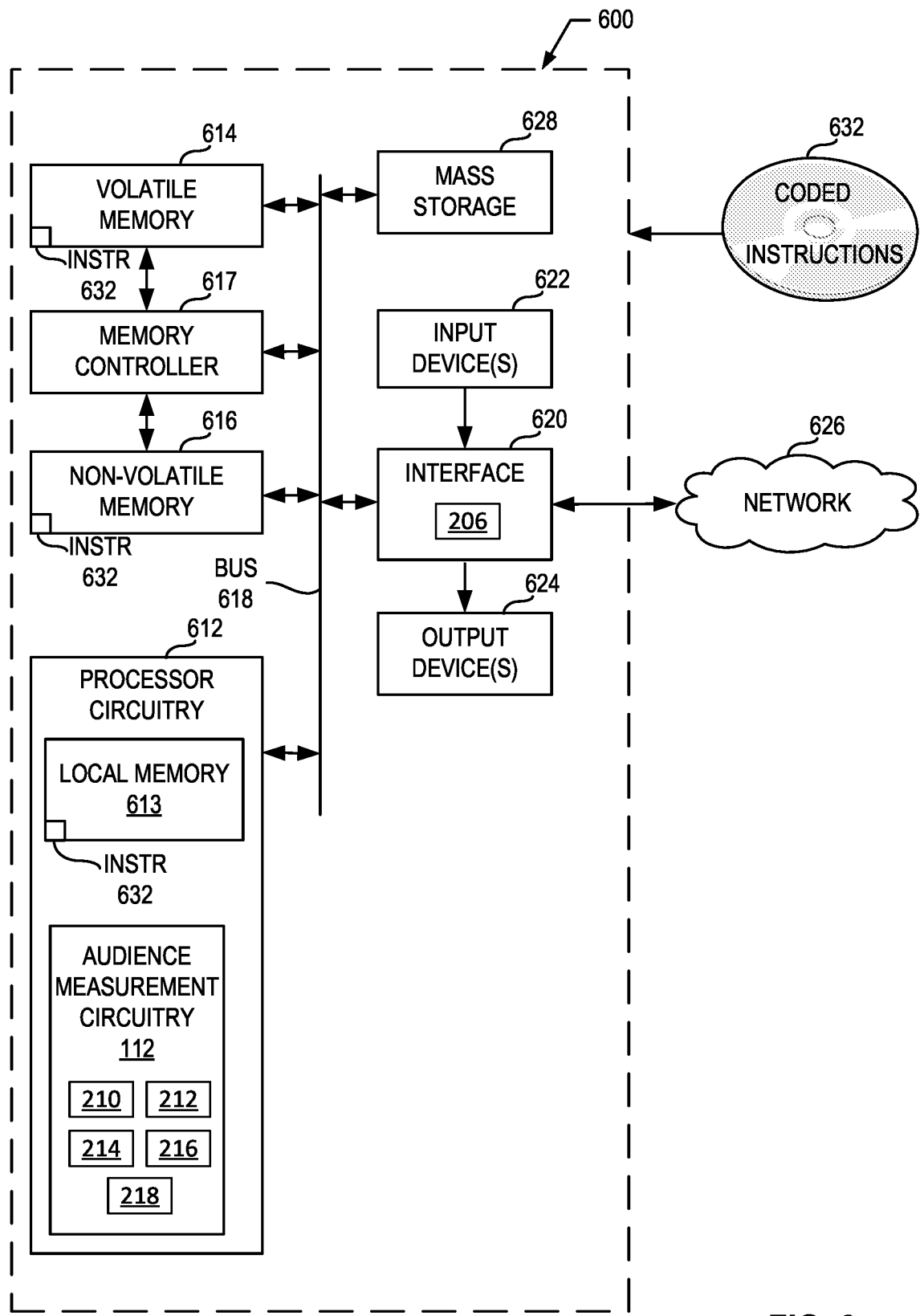
FIG. 6 is a block diagram of an example processing platform including processor circuitry structured to execute the example machine readable instructions and/or the example operations of FIG. 3 to implement the audience measurement circuitry of FIG. 2.

FIG. 6 is a block diagram of an example processor platform 600 structured to execute and/or instantiate the machine readable instructions and/or the operations of FIGS. 3-5 to implement the audience measurement circuitry 112 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the audio block compiling circuitry 210, the data parsing circuitry 212, the media identification assignment circuitry 214, the signal monitoring circuitry 216, the data link orchestration circuitry 218, and/or more generally the audience measurement circuitry 112.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIGS. 3-5, may be stored in the mass storage device 628, in the volatile memory 614, in the non-volatile memory 616, and/or on a removable non-transitory computer readable storage medium such as a CD or DVD.

Figure 7:
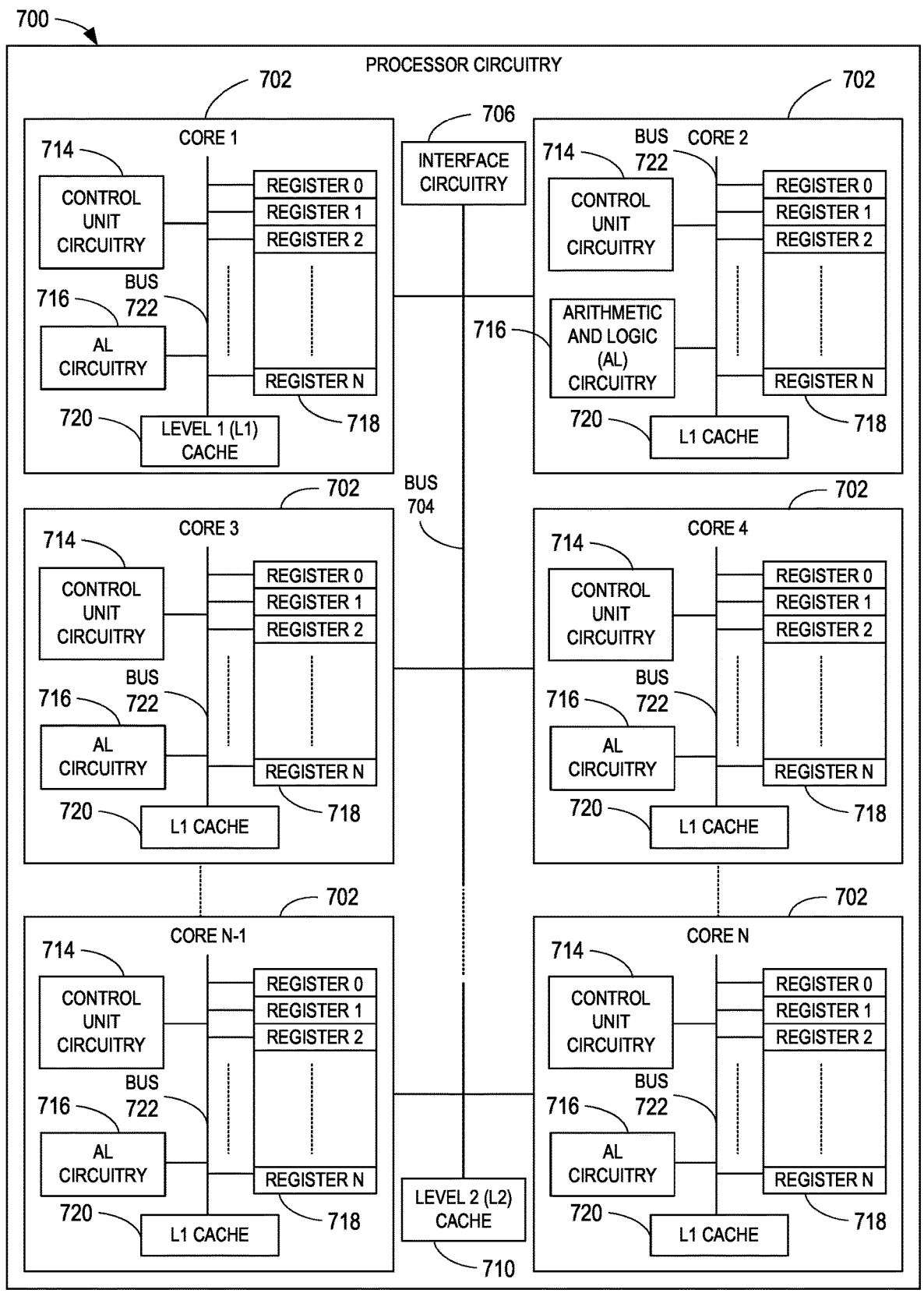
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowcharts of FIGS. 3-5 to effectively instantiate the circuitry of FIG. 2 as logic circuits to perform the operations corresponding to those machine readable instructions. In some such examples, the circuitry of FIG. 2 is instantiated by the hardware circuits of the microprocessor 700 in combination with the instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3-5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 612 of FIG. 6. In this example, the processor circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

Figure 8:
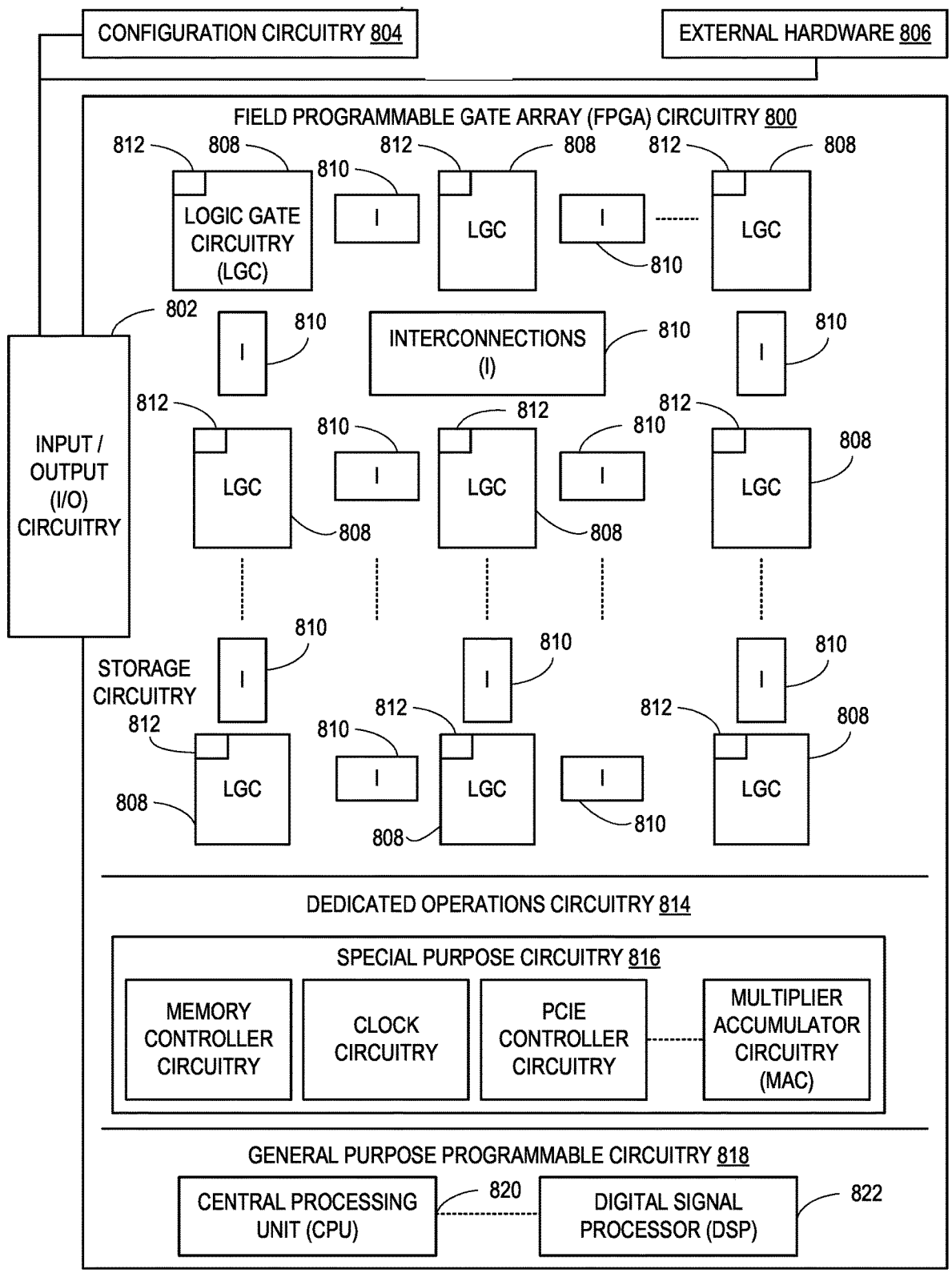
FIG. 8 is a block diagram of another example implementation of the processor circuitry of FIG. 6.

More specifically, in contrast to the microprocessor 700 of FIG. 7 described above (which is a general purpose device that may be programmed to execute some or all of the machine readable instructions represented by the flowcharts of FIGS. 3-5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3-5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3-5. As such, the FPGA circuitry 800 may be structured to effectively instantiate some or all of the machine readable instructions of the flowcharts of FIGS. 3-5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3-5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 700 of FIG. 7. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIGS. 3-5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 6 illustrate two example implementations of the processor circuitry 612 of FIG. 6, many other approaches are contemplated. For example, as mentioned above, modern FPGA circuitry may include an onboard CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3-5 may be executed by one or more of the cores 702 of FIG. 7, a second portion of the machine readable instructions represented by the flowcharts of FIGS. 3-5 may be executed by the FPGA circuitry 800 of FIG. 8, and/or a third portion of the machine readable instructions represented by the flowcharts of FIGS. 3-5 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
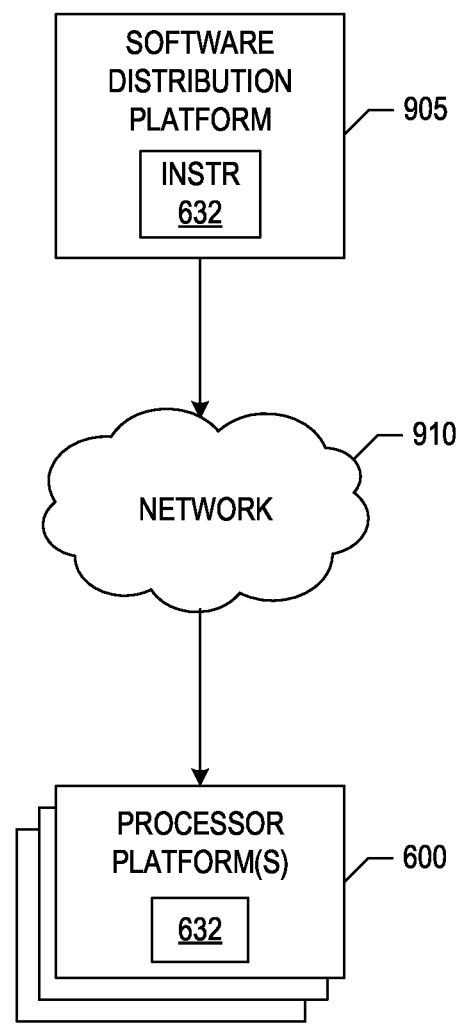
FIG. 9 is a block diagram of an example software distribution platform (e.g., one or more servers) to distribute software (e.g., software corresponding to the example machine readable instructions of FIGS. 3-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 300, 500, etc. of FIGS. 3-5, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 300, 500, etc. of FIGS. 3-5, may be downloaded to the example processor platform 600, which is to execute the machine readable instructions 632 to implement the audience measurement circuitry 112 of FIG. 2. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that measure audience exposure to media stream with a wireless isochronous data link. Disclosed systems, methods, apparatus, and articles of manufacture improve the efficiency of using a computing device by enabling the indirect monitoring of audio data on a point-to-point wireless data link without any overhead to the audience member's audio sink device. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising a datastore, network interface circuitry to communicatively couple a processor circuitry to a wireless network, and the processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the network interface circuitry to obtain a first copy of audio data from a first wireless data link, the audio data transmitted from an audio source device, wherein a second copy of the audio data is transmitted, synchronously to the first copy of the audio data, to an audio sink device over a second wireless data link, and the processor circuitry to perform at least one of the first operations, the second operations, or the third operations to instantiate data parsing circuitry to parse a media stream identifier from the first copy of the audio data, and media identification assignment circuitry to assign the media stream identifier to an audio data log for the audio sink device.

Example 2 includes the apparatus of example 1, wherein the processor circuitry to perform at least one of the first operations, the second operations, or the third operations to instantiate signal monitoring circuitry to monitor a packet loss threshold of the first wireless data link to determine an excessive packet loss event, and modify the audio data log to indicate insufficient monitoring during a temporal window of the excessive packet loss event.

Example 3 includes the apparatus of example 1, wherein the processor circuitry to perform at least one of the first operations, the second operations, or the third operations to instantiate signal monitoring circuitry to monitor a packet loss threshold of the second wireless data link to determine an excessive packet loss event, and modify the audio data log to indicate insufficient audience reception during a temporal window of the excessive packet loss event, and the data parsing circuitry to pause parsing of the second copy of the audio data during the temporal window.

Example 4 includes the apparatus of example 1, wherein the processor circuitry to perform at least one of the first operations, the second operations, or the third operations to instantiate signal monitoring circuitry to monitor an end of employment of the second copy of the audio data by the audio sink device, and the data parsing circuitry to discontinue parsing of the first copy of the audio data.

Example 5 includes the apparatus of example 1, wherein the processor circuitry to perform at least one of the first operations, the second operations, or the third operations to instantiate data link orchestration circuitry to receive a permission from the audio source device to obtain the first copy of the audio data in response to the audio source device providing the second copy of the audio data to the audio sink device.

Example 6 includes the apparatus of example 5, wherein the processor circuitry to perform at least one of the first operations, the second operations, or the third operations to instantiate the data link orchestration circuitry to at least partially orchestrate the first data link between the audio source device and the network interface circuitry using the wireless data signal in response to the permission being received from the audio source device, and send a ready-to-monitor indicator to the audio source device.

Example 7 includes the apparatus of example 1, wherein the processor circuitry to perform at least one of the first operations, the second operations, or the third operations to instantiate audio block compiling circuitry to compile an audio block of the first copy of the audio data obtained from a plurality of data packets from the first wireless data link.

Example 8 includes the apparatus of example 1, wherein the wireless network is a Bluetooth® wireless network with isochronous channels.

Example 9 includes At least one non-transitory computer-readable storage medium comprising instructions that, when executed, cause one or more processors of a machine to at least obtain a first copy of audio data from a first wireless data link on a wireless network, the audio data transmitted from an audio source device, wherein a second copy of the audio data is transmitted, synchronously to the first copy of the audio data, to an audio sink device over a second wireless data link, parse a media stream identifier from the first copy of the audio data, and assign the media stream identifier to an audio data log for the audio sink device.

Example 10 includes the non-transitory computer-readable medium of example 9, wherein the instructions, when executed, cause one or more processors of a machine to at least monitor a packet loss threshold of the first wireless data link to determine an excessive packet loss event, and modify the audio data log to indicate insufficient monitoring during a temporal window of the excessive packet loss event.

Example 11 includes the non-transitory computer-readable medium of example 9, wherein the instructions, when executed, cause one or more processors of a machine to at least monitor a packet loss threshold of the second wireless data link to determine an excessive packet loss event, modify the audio data log to indicate insufficient audience reception during a temporal window of the excessive packet loss event, and pause parsing of the second copy of the audio data during the temporal window.

Example 12 includes the non-transitory computer-readable medium of example 9, wherein the instructions, when executed, cause one or more processors of a machine to at least monitor an end of employment of the second copy of the audio data by the audio sink device, and discontinue parsing of the first copy of the audio data.

Example 13 includes the non-transitory computer-readable medium of example 9, wherein the instructions, when executed, cause one or more processors of a machine to at least receive a permission from the audio source device to obtain the first copy of the audio data in response to the audio source device providing the second copy of the audio data to the audio sink device.

Example 14 includes the non-transitory computer-readable medium of example 13, wherein the instructions, when executed, cause one or more processors of a machine to at least partially orchestrate the first data link between the audio source device and an audience measurement device using the wireless data signal in response to the permission being received from the audio source device, and send a ready-to-monitor indicator to the audio source device.

Example 15 includes the non-transitory computer-readable medium of example 9, wherein the instructions, when executed, cause one or more processors of a machine to at least compile an audio block of the first copy of the audio data obtained from a plurality of data packets from the first wireless data link.

Example 16 includes the non-transitory computer-readable medium of example 9, wherein the wireless network is a Bluetooth® wireless network with isochronous channels.

Example 17 includes a method, comprising obtaining a first copy of audio data from a first wireless data link on a wireless network, the audio data transmitted from an audio source device, wherein a second copy of the audio data is transmitted, synchronously to the first copy of the audio data, to an audio sink device over a second wireless data link, parsing a media stream identifier from the first copy of the audio data, and assigning the media stream identifier to an audio data log for the audio sink device.

Example 18 includes the method of example 17, including monitoring a packet loss threshold of the first wireless data link to determine an excessive packet loss event, and modifying the audio data log to indicate insufficient monitoring during a temporal window of the excessive packet loss event.

Example 19 includes the method of example 17, including monitoring a second packet loss threshold of the second wireless data link to determine an excessive packet loss event, modifying the audio data log to indicate insufficient audience reception during a temporal window of the excessive packet loss event, and pausing parsing of the second copy of the audio data during the temporal window.

Example 20 includes the method of example 17, including monitoring an end of employment of the second copy of the audio data by the audio sink device, and discontinuing parsing of the first copy of the audio data.

Example 21 includes the method of example 17, including receiving a permission from the audio source device to obtain the first copy of the audio data in response to the audio source device providing the second copy of the audio data to the audio sink device.

Example 22 includes the method of example 21, including at least partially orchestrating the first data link between the audio source device and an audience measurement device using the wireless data signal in response to the permission being received from the audio source device, and sending a ready-to-monitor indicator to the audio source device.

Example 23 includes the method of example 17, including compiling an audio block of the first copy of the audio data obtained from a plurality of data packets from the first wireless data link.

Example 24 includes the method of example 17, wherein the wireless network is a Bluetooth® wireless network with isochronous channels.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method of measuring audience exposure to media streams, comprising:
   obtaining a first copy of audio data from a first wireless data link on a wireless network, the audio data transmitted from an audio source device to a first audio sink device, wherein a second copy of the audio data is transmitted, synchronously to the first copy of the audio data, to a second audio sink device over a second wireless data link; and measuring exposure to the first copy of audio data transmitted on the first wireless data link based on processing, by the second audio sink device, an indicator providing status of the first copy of audio data.

2. The method of claim 1, further comprising receiving the indicator from the audio source device.

3. The method of claim 1, further comprising receiving the indicator from the first audio sink device.

4. The method of claim 3, wherein receiving the indicator from the first audio sink device further comprises receiving the indicator transmitted from a headphone, wherein the indicator providing a headphone receiving status for the first copy of the audio data transmitted from the audio source device.

5. The method of claim 1, wherein processing the indicator further comprising
the second data sink device pausing or discontinue analyzing the second copy of the audio data in response to at least one additional indicator received from the audio source device.

6. The method of claim 1, wherein processing the indicator providing status further comprising providing a status selected from a group consisting of beginning a wireless transmission of the audio data to the first audio sink device, ending a wireless transmission of the audio data to the first audio sink device, and losing data packets during a wireless transmission of the audio data to the first audio sink device.

7. An apparatus to measure audience exposure to media streams, comprising:
a first audio sink device to obtain a first copy of audio data from a first wireless data link on a wireless network, the audio data transmitted from an audio source device, wherein a second copy of the audio data is transmitted, synchronously to the first copy of the audio data, to a second audio sink device over a second wireless data link; and
a second audio sink device to measure exposure to the first copy of audio data transmitted on the first wireless data link based on processing, by the second audio sink device, an indicator to provide status of the first copy of audio data.

8. The apparatus of claim 7, further comprising an indicator received from the audio source device.

9. The apparatus of claim 7, further comprising an indicator received from the first audio sink device.

10. The apparatus of claim 9, wherein the indicator received from the first audio sink device further comprises receiving the indicator transmitted from a headphone, wherein the indicator providing a headphone receiving status for the first copy of the audio data transmitted from the audio source device.

11. The apparatus of claim 7, wherein processing the indicator further comprising
the second data sink device pausing or discontinue analyzing the second copy of the audio data in response to at least one additional indicator received from the audio source device.

12. The apparatus of claim 7, wherein processing the indicator to provide status further comprising providing a status selected from a group consisting of beginning a wireless transmission of the audio data to the first audio sink device, ending a wireless transmission of the audio data to the first audio sink device, and a loss of data packets during a wireless transmission of the audio data to the first audio sink device.

13. At least one non-transitory computer-readable storage medium storing program instructions that when executed by one or more processors perform a set of steps comprising:
obtaining a first copy of audio data from a first wireless data link on a wireless network, the audio data transmitted from an audio source device to a first audio sink device, wherein a second copy of the audio data is transmitted, synchronously to the first copy of the audio data, to a second audio sink device over a second wireless data link; and
measuring exposure to the first copy of audio data transmitted on the first wireless data link based on processing, by the second audio sink device, an indicator providing status of the first copy of audio data.

14. The non-transitory computer-readable storage medium of claim 13, further comprising receiving the indicator from the audio source device.

15. The non-transitory computer-readable storage medium of claim 13, further comprising receiving the indicator from the first audio sink device.

16. The non-transitory computer-readable storage medium of claim 15, wherein receiving the indicator from the first audio sink device further comprises receiving the indicator transmitted from a headphone, wherein the indicator providing a headphone receiving status for the first copy of the audio data transmitted from the audio source device.

17. The non-transitory computer-readable storage medium of claim 13, wherein processing the indicator further comprising
the second data sink device pausing or discontinue analyzing the second copy of the audio data in response to at least one additional indicator received from the audio source device.

18. The non-transitory computer-readable storage medium of claim 13, wherein processing the indicator providing status further comprising providing a status selected from a group consisting of beginning a wireless transmission of the audio data to the first audio sink device, ending a wireless transmission of the audio data to the first audio sink device, and losing data packets during a wireless transmission of the audio data to the first audio sink device.

* * * * *